(12) United States Patent
Kim et al.

(10) Patent No.: US 8,315,639 B2
(45) Date of Patent: Nov. 20, 2012

(54) METHOD OF TRANSMITTING REFERENCE SIGNALS FOR COOPERATIVE WIRELESS COMMUNICATION SYSTEM AND METHOD OF ALLOCATING RADIO RESOURCES FOR RELAY-BASED WIRELESS COMMUNICATION SYSTEM

(75) Inventors: Byoung Hoon Kim, Anyang-si (KR);
Han Byul Seo, Anyang-si (KR); Jun Ho Jo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 12/510,910

(22) Filed: Jul. 28, 2009

(65) Prior Publication Data

US 2010/0080269 A1    Apr. 1, 2010

Related U.S. Application Data

(60) Provisional application No. 61/101,232, filed on Sep. 30, 2008.

(30) Foreign Application Priority Data

Nov. 6, 2008  (KR) .................. 10-2008-0109614

(51) Int. Cl.
*H04W 72/00*    (2009.01)

(52) U.S. Cl. ............. 455/450; 455/7; 455/11.1; 455/17; 370/315

(58) Field of Classification Search .................. 455/450, 455/7, 11.1, 17; 370/315

See application file for complete search history.

(56) References Cited

U.S. PATENT DOCUMENTS

| | | | |
|---|---|---|---|
| 2008/0013606 A1* | 1/2008 | Boariu et al. | 375/211 |
| 2008/0207214 A1 | 8/2008 | Han et al. | |
| 2008/0219275 A1* | 9/2008 | Boariu et al. | 370/401 |
| 2008/0227386 A1* | 9/2008 | Dayal et al. | 455/7 |
| 2008/0285477 A1* | 11/2008 | Kuroda et al. | 370/252 |
| 2009/0201846 A1* | 8/2009 | Horn et al. | 370/315 |
| 2009/0203309 A1* | 8/2009 | Okuda | 455/7 |
| 2010/0029262 A1* | 2/2010 | Wang et al. | 455/423 |
| 2011/0151773 A1* | 6/2011 | Okuda | 455/9 |

FOREIGN PATENT DOCUMENTS

| | | |
|---|---|---|
| KR | 1020070062757 | 6/2007 |
| KR | 1020070082284 | 8/2007 |
| KR | 1020080037398 | 4/2008 |

* cited by examiner

*Primary Examiner* — Barry Taylor
(74) *Attorney, Agent, or Firm* — Lee, Hong, Degerman, Kang & Waimey

(57) ABSTRACT

A method of transmitting reference signals in a wireless communication system for cooperative communication is provided. The wireless communication system defines a plurality of transmission patterns of the reference signals each having a different pattern, and each of a plurality of base stations and/or each of a base station and a relay station participating in the cooperative communication transmit the reference signals based on one transmission pattern selected from the plurality of transmission patterns of the reference signals.

2 Claims, 5 Drawing Sheets

First transmission pattern

Second transmission pattern

Third transmission pattern

First transmission pattern

Second transmission pattern

Third transmission pattern
RS    Subframe

Frame

METHOD OF TRANSMITTING REFERENCE SIGNALS FOR COOPERATIVE WIRELESS COMMUNICATION SYSTEM AND METHOD OF ALLOCATING RADIO RESOURCES FOR RELAY-BASED WIRELESS COMMUNICATION SYSTEM

CROSS-REFERENCE TO RELATED APPLICATIONS

Pursuant to 35 U.S.C. § 119, application claims the benefit of earlier filing date and right of priority to Korean Patent Application No. 10-2008-0109614, filed on Nov. 6, 2008, and also claims the benefit of U.S. Provisional Application Serial No. 61/101,232, filed on Sep. 30, 2008, the contents of which are all incorporated by reference herein in their entirety.

BACKGROUND

1. Technical Field

The present invention relates to wireless communications, and more particularly, to a method of transmitting reference signals in a cooperative wireless communication system (i.e., multi-cell cooperative wireless communication system or a relay-based wireless communication system) and a method of allocating radio resources (RRs) in the relay-based wireless communication system.

2. Related Art

In next generation multimedia mobile communication systems, which have been actively studied in recent years, there is a demand for a system capable of processing and transmitting a variety of information (e.g., video and wireless data) in addition to an early-stage voice service. In order to maximize efficiency of a limited radio resource in a mobile communication system, methods for more effectively transmitting data in time, space, and frequency domains have been proposed.

Orthogonal frequency division multiplexing (OFDM) uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM, complexity of the receiver can be reduced in a frequency selective fading environment of a broadband channel, and spectral efficiency can be increased when selective scheduling is performed in a frequency domain by using a channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multiple users.

To maximize efficiency in the space domain, the OFDM/OFDMA-based system uses a multiple-antenna technique (e.g., multiple input multiple output (MIMO), single input multiple output (SIMO), and multiple input single output (MISO)) which is used as a suitable technique for high-speed multimedia data transmission by generating a plurality of time/frequency domains in the spatial domain. The OFDM/OFDMA-based system also uses a channel coding scheme for effective use of resources in the time domain, a scheduling scheme which uses a channel selective characteristic of a plurality of users, a hybrid automatic repeat request (HARQ) scheme suitable for packet data transmission, etc.

To guarantee high-speed data transmission, each channel through which data is transmitted has to be estimated with high reliability. It is important to design a reference signal for channel estimation in order to increase the reliability of channel estimation. The reference signal is known, in advance, to both the transmitter and the receiver, and is also referred to as a pilot. A channel environment may change variously depending on time, space, and frequency, and thus the reference signal has to be transmitted to the receiver by designing the reference signal such that the reliability of channel estimation can be increased by flexibly coping with the channel environment.

FIG. 1 shows an example of a frame structure, in particular, a frame structure for a long term evolution (LTE) wireless communication system. A 'frame' is a data sequence used according to a physical specification in a fixed time duration, and is an arbitrary time unit for processing data in a wireless communication system. The term 'frame' is for exemplary purposes only, and thus its term and structure may differ depending on a type of the wireless communication system.

Referring to FIG. 1, the frame for the LTE wireless communication system consists of 10 subframes. Since one frame has a length of 10 milliseconds (ms), a subframe has a length of 1 ms. One subframe may include a plurality of OFDM symbols (i.e., 14 OFDM symbols) in a time domain, and may include any number of subcarriers in a frequency domain. As such, the subframe is time-spanned on the OFDM symbols, and is frequency-spanned on the subcarriers. One subframe may include a plurality of basic units. Hereinafter, a basic unit denotes an allocation unit of reference signals. The basic unit is time-spanned on the OFDM symbols, and is frequency-spanned on the subcarriers. The basic units can be consecutively assigned in the time domain and/or the frequency domain for data transmission. Preferably, the number of OFDM symbols for time-spanning the basic unit is set to a divisor of the number of OFDM symbols for time-spanning the subframe. For example, if the subframe is time-spanned on 6 OFDM symbols, the basic unit may be time-spanned on one OFDM symbol, two OFDM symbols, three OFDM symbols, or six OFDM symbols.

A 'resource block' is a term used in association with the basic unit in the LTE wireless communication system. The resource block is a unit of allocating radio resources to a user. In the LTE wireless communication system, one resource block may consist of 12 subcarriers by 7 OFDM symbols.

The aforementioned frame structure is for exemplary purposes only, and thus the number of subframes included in the frame, the number of OFDM symbols for time-spanning the subframe, the number of subcarriers for frequency-spanning the subframe, a structure of a basic unit included in the subframe, or the number of basic units included in the subframe may variously change.

In general, reference signals are periodically transmitted in the wireless communication system. In particular, according to a conventional method of transmitting reference signals, the reference signals are designed to have a single transmission pattern in the aforementioned frame structure. For example, when one frame consists of several subframes, specific positions of each subframe are assigned for reference signals by each base station (BS), and the BS transmits the reference signals arranged in the same pattern to a mobile station (MS).

The conventional method of transmitting reference signals is used for a conventional wireless communication system, i.e., a non-cooperative wireless communication system in which one MS communicates with only one BS without cooperative transmission and reception between cells and/or in which a relay station (RS) is not used in communication between the MS and the BS. In the non-cooperative communication system, no problem has arisen in terms of communication between the MS and the BS or efficient usage of radio resources, even if the reference signals are transmitted based on only one pattern. A cooperative communication scheme of a plurality of BSs and/or a multi-hop transmission scheme using one or more RSs are considered in a newly proposed wireless communication system of next generation. However, the aforementioned conventional method of transmitting reference signals may experience difficulty in effectively operating communication/transmission schemes to be newly introduced in a cooperative wireless communication system.

Accordingly, there is a need for a new method of transmitting reference signals so as to effectively operate communication/transmission schemes to be newly introduced in a cooperative wireless communication system.

SUMMARY

The conventional method of transmitting reference signals has a characteristic in that a base station (BS) transmits the reference signals in the same pattern. The reference signal is a pre-determined transmission signal between the BS and a mobile station (MS), and is used by the MS to identify a cell or to perform channel estimation for demodulation. In the past, all wireless communication systems use the same method of transmitting reference signals without especially discriminating a transmission pattern of each reference signal. For example, in a frame consisting of a plurality of subframes, each BS transmits a reference signal at a specific position of each subframe.

Such a method of transmitting reference signals is not particularly problematic in the conventional simple wireless communication system in which an MS directly communicates with one BS and in which cooperative transmission and reception between cells are not performed between neighboring BSs. However, in a next generation wireless network in which a wireless relay station (RS) is introduced as one constitutional element of a wireless communication system and/or in which cooperative transmission and reception between cells are expected to be introduced, the conventional method of transmitting reference signals may cause difficulties in operating functional elements to be newly introduced.

For example, it is assumed that the wireless communication system further comprises one or more wireless RSs in addition to the MS and the BS. The wireless RS receives a downlink signal for MSs from the BS, and transmits the received downlink signal to the MSs. In this case, during a time when the wireless RS receives the signal from the BS, the signal cannot be transmitted to the MSs at a specific time point via a specific frequency channel (i.e., downlink channel). This is because, if this is allowed, the wireless RS may experience that a received signal (from the BS) is significantly interfered by a signal (for the MS) transmitted by the wireless RS itself. Therefore, at a time point where the wireless RS receives the signal from the BS via the downlink channel, the MSs connected to corresponding wireless RSs cannot receive any signal including a reference signal from the wireless RSs. However, in this case, if the MSs cannot recognize a fact that the reference signal is not transmitted at that time point, channel estimation is attempted on a specific radio resource region even though the reference signal is not transmitted. Therefore, a channel estimation value is inevitably distorted.

Such a problem is also problematic in a wireless communication system in which inter-cell cooperation is introduced.

As an example of the wireless communication system in which inter-cell cooperation is achieved, it is assumed that two femto-cells having almost overlapping coverage is used. In this case, serious interference occurs when reference signals are simultaneously transmitted in the two femto-cells. Thus, the reference signals are preferably transmitted at different time points in the two femto-cells.

According to an aspect of the present invention, there is provided a method of transmitting reference signals that can be used in a wireless communication system including a wireless RS and/or supporting inter-cell cooperation.

According to another aspect of the present invention, there is provided a method of transmitting reference signals, whereby a wireless RS and a BS can both effectively transmit data or whereby a plurality of BSs supporting cooperative communication can effectively transmit data in a wireless communication system including the wireless RS and/or supporting inter-cell cooperation.

Meanwhile, when a reference signal or the like is transmitted according to a conventional method of allocating radio resources in the wireless communication system including the wireless RS and/or supporting inter-cell cooperation, other types of methods are necessary to solve the aforementioned problems. In the conventional method in which a BS transmits a signal to an MS and/or an RS only through a downlink band, if a wireless RS transmits a downlink signal in every subframe, it is impossible for the BS to transmit a signal to the wireless RS. Therefore, in this case, the BS can transmit a signal to the wireless RS only when a band other than the downlink band is used. This implies that there is a need to newly design a frame structure for transmitting a reference signal, a data signal, or the like.

According to another aspect of the present invention, there is provided a method of allocating radio resources, whereby a BS and a wireless RS both can effectively transmit signals in a wireless communication system including the wireless RS even if a conventional method of allocating reference signals is used.

According to an aspect of the present invention, a method of transmitting reference signals in a wireless communication system for cooperative communication is provided. The wireless communication system defines a plurality of transmission patterns of the reference signals each having a different pattern, and each of a plurality of base stations and/or each of a base station and a relay station participating in the cooperative communication transmit the reference signals based on one transmission pattern selected from the plurality of transmission patterns of the reference signals.

The transmission patterns of the reference signals may be defined by using whether the reference signals are transmitted at each of a plurality of subframes in a frame unit consisting of the plurality of subframes. In some or all of the plurality of transmission patterns of the reference signals, the reference signals may be transmitted in a mutually exclusive manner.

According to an aspect of the present invention, a method of allocating radio resources in a relay-based wireless communication system is provided. The wireless communication system has an uplink band and a downlink band which are separated with each other, and a base station of the wireless communication system transmits a signal to a relay station by using one band randomly selected from the uplink band and the downlink band.

According to the present invention, a base station (BS) and a relay station (RS) can transmit reference signals independently in non-overlapping subframes in a wireless communication system including the wireless RS. Further, in a cooperative wireless communication system in which inter-cell cooperation is achieved, reference signals can be independently transmitted in non-overlapping subframes between neighboring BSs having an overlapping coverage. Alternatively, a BS can transmit a signal via not only a downlink band but also an uplink band at a specific time point, and thus radio resources can be further effectively used.

DESCRIPTION OF EXEMPLARY EMBODIMENTS

Figure 1:
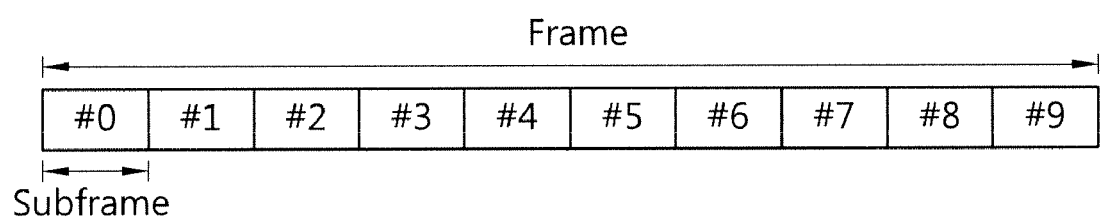
FIG. 1 shows an example of a frame structure.
Figure 2:
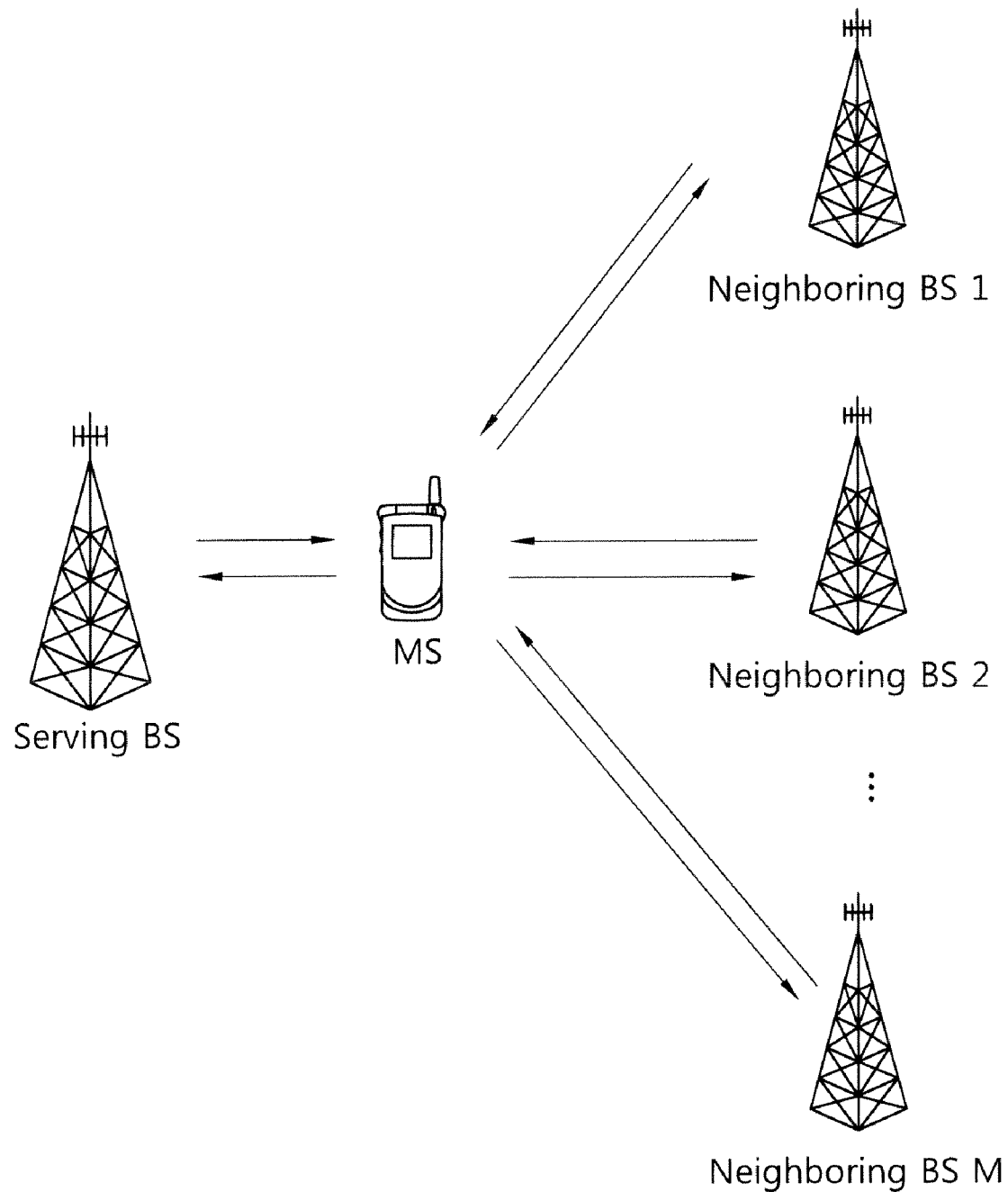
FIG. 2 is a diagram showing an exemplary structure of a multi-cell cooperative wireless communication system as an example of a wireless communication system according to an embodiment of the present invention.

FIG. 2 is a diagram showing an exemplary structure of a multi-cell cooperative wireless communication system as an example of a wireless communication system according to an embodiment of the present invention. Referring to FIG. 2, the multi-cell cooperative wireless communication system includes a mobile station (MS), a serving base station (BS) located in a cell to which the MS belongs, and M neighboring BSs (where M is an integer greater than or equal to 1). The multi-cell cooperative wireless communication system can be widely deployed to provide a variety of communication services, such as voices, packet data, etc. Not only the serving BS but also the neighboring BSs participate in transmission and reception of downlink (DL) and/or uplink (UL) signals.

Figure 3:
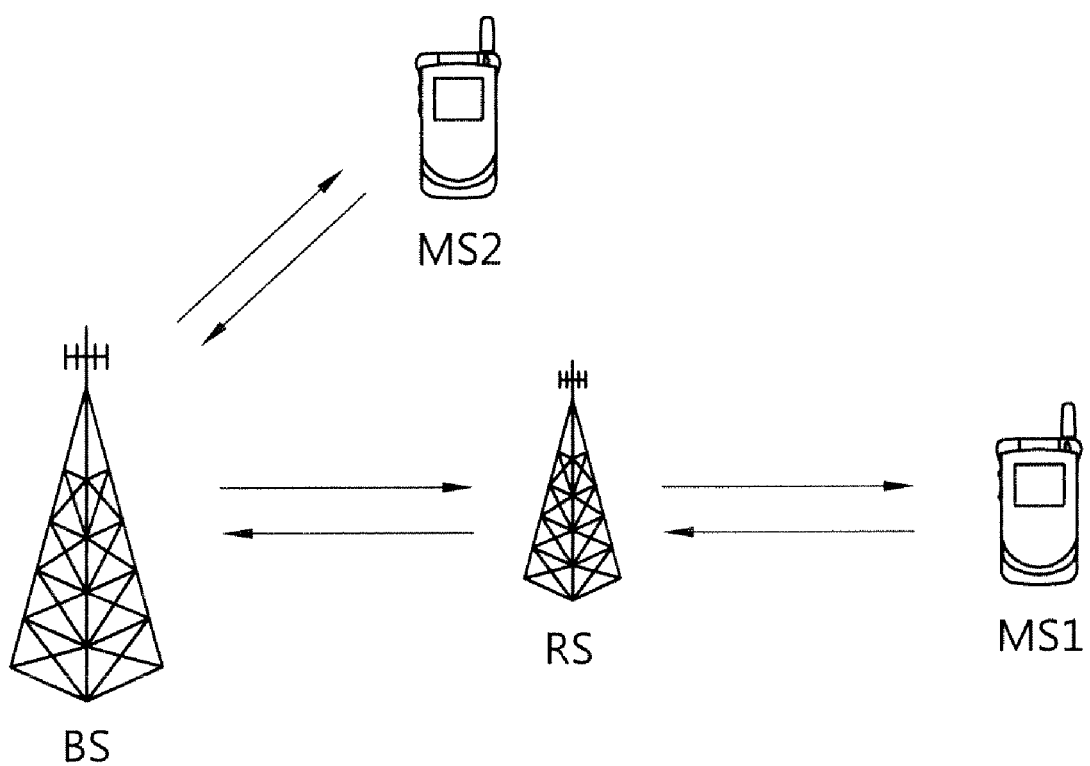
FIG. 3 is a diagram showing an exemplary structure of a relay-based cooperative wireless communication system as an example of a wireless communication system according to an embodiment of the present invention.

FIG. 3 is a diagram showing an exemplary structure of a relay-based cooperative wireless communication system as an example of a wireless communication system according to an embodiment of the present invention. Referring to FIG. 3, the relay-based cooperative wireless communication system includes a BS, a RS (or cooperative node), and one or more MSs. The relay-based cooperative wireless communication system can be widely deployed to provide a variety of communication services, such as voices, packet data, etc.

An embodiment of the present invention to be described below can be used in various wireless communication systems. For example, the embodiment of the present invention may also apply not only to a communication system having multiple transmit (Tx) antennas but also a single Tx antenna. Such a wireless communication system may be not only a multiple input multiple output (MIMO) system or a multiple input single output (MISO) system but also a single input single output (SISO) system or a single input multiple output (SIMO) system. In addition, the embodiment of the present invention may apply regardless of a channel coding scheme of the wireless communication system. That is, various well-known channel coding schemes (e.g., convolutional coding, turbo coding, etc.) may be used.

Further, the embodiment of the present invention may be applied to all multi-cell cooperative wireless communication systems regardless of a method in which a serving BS and a neighboring BS cooperate with each other. That is, the embodiment of the present invention may be applied to the multi-cell cooperative wireless communication systems regardless of a method of transmitting DL signals by a serving BS and a neighboring BS in the multi-cell cooperative wireless communication system or a method of combining UL signals received by the serving BS and the neighboring BS.

An MS may be fixed or mobile, and may be referred to as another terminology, such as a user equipment (UE), a user terminal (UT), a subscriber station (SS), a wireless device, etc. The MS includes at least a transceiver and a processor. The transceiver is an entity by which the MS can transmit and receive various signals and data (i.e., UL signals and DL signals) through a wireless network such as a mobile communication network. The processor controls an operation of the MS and generates a UL signal to be transmitted through the transceiver or decodes a received DL signal. Further, the processor performs a function for controlling UL power according to the embodiment of the present invention to be described below.

A BS (a serving BS, a neighboring BS) is generally a fixed station that communicates with the MS and may be referred to as another terminology, such as an evolved node-B (eNB), a base transceiver system (BTS), an access point, etc. According to the embodiment of the present invention, the BS may select a reference signal arranged in a specific pattern from a plurality of reference signals, and transmit the selected reference signal to the RS and/or the MS. In addition, in a wireless communication system in which a UL band and a DL band are separated, the BS may select one of the two bands and then transmit a signal to the RS.

Method of Transmitting Reference Signals

In a method of transmitting reference signals according to an embodiment of the present invention, it is premised that several patterns are used to transmit the reference signals. An entity (e.g., BS or RS) transmitting the reference signals selects any one transmission pattern from a plurality of transmission patterns for the reference signals, and then transmits the reference signals. In this case, to provide periodicity in the transmission of the reference signals, the transmission pattern for the reference signals may be repeated in a certain unit (e.g., a frame unit or a multiple unit of a frame).

A 'frame' is a data sequence used according to a physical specification in a fixed time duration, and is an arbitrary time unit for processing data in a wireless communication system. For example, in case of a long term evolution (LTE) wireless communication system, the frame has a length of 10 milliseconds (ms). The frame consists of a plurality of subframes (e.g., 10 subframes in case of the LTE wireless communication system). The number of subframes constituting one frame may differ depending on types of wireless communication systems. The term 'frame' and its structure used in the present invention is for exemplary purposes only, and thus its term and structure may change when using a $4^{th}$ generation wireless communication system or other types of wireless communication systems.

More specifically, it is assumed that the transmission pattern of the reference signals is repeated in a frame unit including a plurality of subframes. It is also assumed that the reference signals cannot be transmitted at any position in each subframe, but the transmission of the reference signals is allowed only at a specific position. In this case, each of a plurality of transmission patterns of the reference signals may be configured in such a manner that transmission and non-transmission of the reference signals in a specific subframe are arbitrarily combined in a whole frame.

For example, among the plurality of transmission patterns, a $1^{st}$ transmission pattern may be configured such that the reference signals are transmitted only at odd subframes in the frame. A $2^{nd}$ transmission pattern may be configured such that the reference signals are transmitted only at even subframes in the frame. A $3^{rd}$ transmission pattern may be configured such that the reference signals are transmitted at all subframes constituting the frame.

Alternatively, among the plurality of transmission patterns, a $4^{th}$ transmission pattern may be configured such that the reference signals are transmitted only at some subframes (e.g., a $1^{st}$ subframe, a $4^{th}$ subframe, a $7^{th}$ subframe, etc.) in the frame. A $5^{th}$ transmission pattern may be configured such that the reference signals are transmitted only at some subframes (e.g., a $2^{nd}$ subframe, a $5^{th}$ subframe, an $8^{th}$ subframe, etc.) in the frame. A $6^{th}$ transmission pattern may be configured such that the reference signals are transmitted only at some subframes (e.g., a $3^{rd}$ subframe, a $6^{th}$ subframe, a $9^{th}$ subframe, etc.) in the frame. Herein, the plurality of transmission patterns may further include the aforementioned $1^{st}$ to $3^{rd}$ transmission patterns.

In this case, preferably, at least some of the plurality of transmission patterns of the reference signals are mutually exclusive, and reasons for this will be described below. For example, it is assumed that the frame consists of 10 subframes. In this case, the $1^{st}$ transmission pattern may be configured such that the reference signals are transmitted at $1^{st}$, $3^{rd}$, $5^{th}$, $7^{th}$, and $9^{th}$ subframes, and the $2^{nd}$ transmission pattern may be configured such that the reference signals are transmitted at $2^{nd}$, $4^{th}$, $6^{th}$, $8^{th}$, and $10^{th}$ subframes. Of course, in the some of the plurality of transmission patterns of the reference signals, subframes at which the reference signals are transmitted may overlap with another transmission pattern. In the aforementioned example, the $3^{rd}$ transmission pattern in which the reference signal are transmitted at all of the 10 subframes may be further included in the plurality of transmission patterns of the reference signals. Each of these three transmission patterns is show in FIG. 4.

Figure 4:
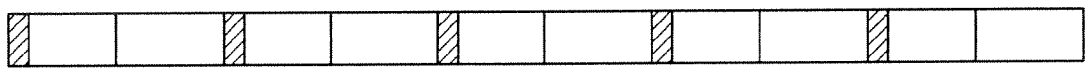
FIG. 4 is a diagram showing exemplary transmission patterns of reference signals according to an embodiment of the present invention.
Figure 4:
Figure 4:
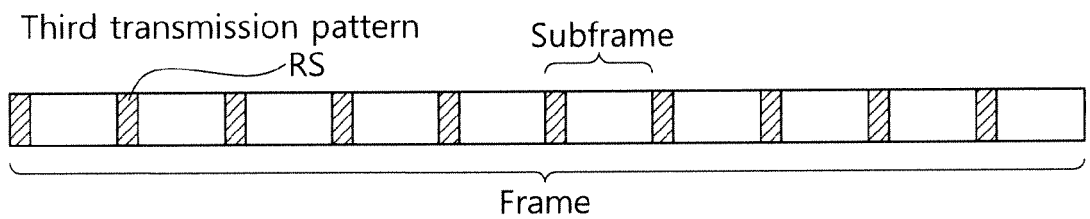

According to the embodiment of the present invention, in a wireless communication system including an RS and/or supporting cooperative communication between cells, a plurality of transmission patterns defined as described above are used to transmit reference signals. More specifically, when the wireless communication system includes the RS, each of a BS and the RS may transmit the reference signals by selecting a mutually exclusive transmission pattern so that transmission times of the reference signals do not overlap. For example, as shown in FIG. 4, the BS may transmit a reference signal in each odd subframe by selecting the $1^{st}$ transmission pattern, and the RS may transmit a reference signal in each even subframe by selecting the $2^{nd}$ transmission pattern. In addition, when a plurality of BSs having an overlapping coverage participate in cooperative transmission, the plurality of BSs may transmit reference signals by selecting mutually exclusive transmission patterns.

As such, according to the embodiment of the present invention, when each BS and/or the RS transmit reference signals according to different transmission patterns, the BS and the RS have to report information on which transmission pattern is used to a receiving apparatus (i.e., RS or MS). According to the embodiment of the present invention, there is no particular restriction on a method of reporting information on the transmission pattern by the BS or RS to the receiving apparatus, and a certain control signal (e.g., a signal for reporting cell information) can be used. In addition, according to an aspect of the present embodiment, if necessary, the BS and the RS may report information on which transmission pattern is used when a reference signal is transmitted in a neighboring cell for handover or the like.

When the reference signal is transmitted only at a part of subframes according to a certain transmission pattern and when the receiving apparatus knows such information, on the basis of the information, the RS or the MS may perform operations such as channel estimation or the like by detecting a reference signal at a subframe including the reference signal. Therefore, according to the embodiment of the present invention, a problem that the MS or the like attempts to detect a reference signal at a subframe not including any reference signal, or incorrect channel estimation caused thereby can be avoided.

According to an aspect of the present embodiment, the BS and/or the RS may not report the information on which transmission pattern of the reference signal is used to the receiving apparatus. That is, even if the information regarding the transmission pattern of the reference signal is not received in advance, the receiving apparatus (e.g., MS, etc.) can detect the reference signal only at the subframe including the reference signal by using a certain method. Hereinafter, the aforementioned method will be described in greater detail with reference to the transmission patterns of FIG. 4.

First, the MS may detect a reference signal with respect to all defined transmission patterns of reference signals, and thereafter calculate reliability on a transmission pattern of each reference signal based on a magnitude of the detected signal. For example, among the transmission patterns shown in FIG. 4, it is assumed that a reference signal using the $1^{st}$ transmission pattern is transmitted. Further, it is assumed that a method of averaging power of reference signals received at subframes of the respective transmission patterns is simply used as a signal detection method. In general, a specific pseudo-noise sequence is used for a reference signal, and thus a receiving MS correlates a specific sequence with a region to which the reference signal is predicted to be transmitted. Consequently, when the specific sequence is correlated with a subframe at which the reference signal is actually transmitted, high receiving (Rx) power appears. On the other hand, when the sequence is correlated with a subframe at which the reference signal is not transmitted, it implies that the pseudo-noise sequence is correlated with actual noise, and thus Rx power appears to be close to 0. In such a situation, when the MS first detects a reference signal based on the $1^{st}$ transmission pattern, signal power is added for averaging only when the reference signal is actually transmitted. Thus, highest Rx signal power can be obtained. On the other hand, when the MS detects the reference signal based on the $2^{nd}$ transmission pattern, signal power is added for averaging only when the reference signal is not actually transmitted. Thus, the lowest Rx signal power can be obtained. Further, when the MS detects the reference signal based on the $3^{rd}$ transmission pattern, Rx signal power having a median value of the two cases can be obtained. This is because, in this case, a signal of great power is received at $1^{st}$, $3^{rd}$, $5^{th}$, $7^{th}$, and $9^{th}$ subframes, but a signal of small power is received at the remaining subframes (i.e., $2^{nd}$, $4^{th}$, $6^{th}$, $8^{th}$ and $10^{th}$ subframes).

Therefore, according to the embodiment of the present invention, the receiving apparatus (e.g., MS, etc.) can determine which transmission pattern is used even in a state where the BS and/or the RS does not report which transmission pattern of a reference signal is used. For this, the MS may use reliability measurement on a transmission pattern of each reference signal. This is for exemplary purposes only, and thus the embodiment of the present invention is not limited thereto. In another embodiment, the MS may only report information on an average value of the calculated Rx signal to the BS, and the BS may determine which a transmission pattern is used.

Band Switching Between BS and RS

The method of transmitting reference signals has been described above under the premise that a wireless communication system uses a half duplex transmission scheme or a time division transmission scheme in which a BS and an RS use downlink region divided in a time domain. Disadvantageously, however, the aforementioned method of transmitting reference signals has to be designed so that an MS can process reference signals of several patterns due to introduction of the RS, and resource use efficiency is decreased. In a normal case of a frequency division duplex wireless communication system using both uplink and downlink, there is a disadvantage in that a DL signal has to be discontinuously transmitted in order for the RS to receive a signal from the BS. A new method of transmitting signals between the BS and the RS to overcome this disadvantage will be described hereinafter.

According to an embodiment of the present invention, when the BS transmits a signal (e.g., data, etc.) to the RS, it is allowed to use not only a DL band but also a UL band so as to overcome the disadvantage in that the RS discontinuously transmits a DL signal. That is, band switching is allowed for downlink transmission between the BS and the RS. This will be described below in greater detail.

For example, it is assumed that the RS transmits a signal to MSs by using the DL band at a specific subframe. In this case, according to a conventional signal transmission method, the RS cannot receive a signal from the BS through the DL band at the specific subframe. This implies that the BS cannot transmit any signal through the DL band used by the RS at the specific subframe, and thus resource use efficiency is decreased to that extent.

According to the embodiment of the present invention, to solve the aforementioned problem, at a time point (e.g., a subframe) where a RS transmits a signal to an MS by using the DL band, the BS transmits the signal to the RS by using all or some parts of the UL band. When the BS uses some parts of the UL band, remaining parts of the UL band can be used by the MS to transmit a signal to the RS. The BS can transmit a signal to the MSs directly communicating with the BS through the DL band.

Figure 5:
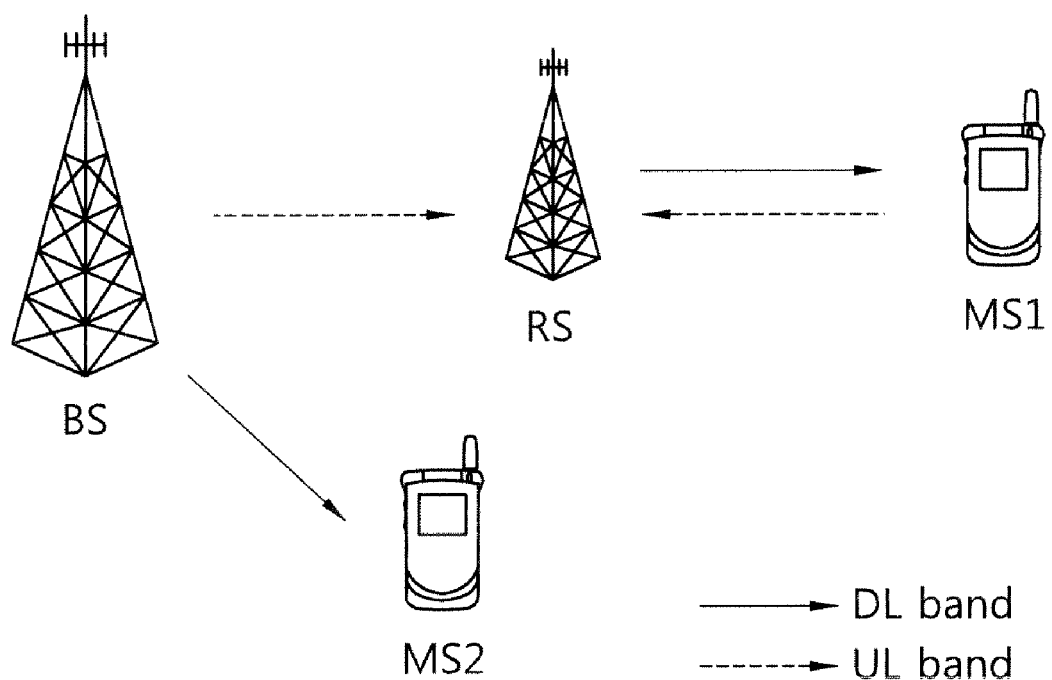
FIG. 5 shows an example of a band switching transmission method according to an embodiment of the present invention.

FIG. 5 shows an example of a band switching transmission method according to an embodiment of the present invention. Referring to FIG. 5, through a DL band, an RS transmits a signal to a first MS (i.e., MS1), and a BS transmits a signal to a second MS (i.e., MS2). Through a UL band, the BS transmits a signal to the RS, and the MS1 also transmits a signal to the RS. In this case, the UL band which the BS and the MS1 use to transmit signals is resources divided in time and/or frequency domains. According to an aspect of the present embodiment, the BS can use a frequency for the UL band by not scheduling users in uplink at a time point (e.g., one or more subframes in every frame) when the BS intends to transmit a signal to the RS in uplink. In this case, regarding the remaining subframes, the BS schedules users (i.e., MSs) on a UL channel, by stopping transmission of a signal to the RS. As a result, the BS and the RS operate in a normal UL Rx mode.

According to exemplary embodiments of the present invention, during a time when a BS transmits a signal to an RS through a UL channel, transmission of several control signals (e.g., sounding reference signal, channel quality information, etc.) to be transmitted periodically or non-periodically from an MS to the BS needs to be temporarily stopped or needs to be performed after a specific delay time. In addition, the BS needs to report to the RS, in advance, a fact that a signal is transmitted using all or some parts of a UL band. The BS needs to have a capability of transmitting a signal through the UL band. Since the RS can intrinsically receive a signal through the UL band, an additional function is not required. However, the RS has to be able to perform signal transmission and reception at the same time.

Although the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A wireless communication system configured to participate in cooperative communication, the wireless communication system comprising:

a relay station configured to transmit an orthogonal frequency division multiplexing (OFDM) symbol to a first user equipment (UE) with a first transmission pattern of reference signals selected from available transmission patterns via a first frequency band during a transmission duration, receive uplink data from the first UE via a second frequency band different from the first frequency band during the transmission duration, and not transmit allocation information related to the first transmission pattern; and a base station configured to transmit the OFDM symbol to the relay station with a second transmission pattern of reference signals selected from the available transmission patterns via the second frequency band during the transmission duration, and not transmit allocation information related to the second transmission pattern, wherein the available transmission patterns include a first pattern in which odd subframes include reference signals and even subframes do not include reference signals, a second pattern in which even subframes include reference signals and odd subframes do not include reference signals, and a third pattern in which every subframe includes reference signals, wherein the first transmission pattern is different from the second transmission pattern, wherein the OFDM symbol includes a frame consisting of ten subframes, and wherein the first UE is configured to detect the first transmission pattern by correlating the available transmission patterns with a received signal without using the allocation information.

2. The system of claim 1, further comprising:

a second UE configured to directly receive the OFDM symbol from the base station, and detect the second transmission pattern by correlating the available transmission patterns with a received signal without using the allocation information.

* * * * *